United States Patent

Leung et al.

[11] Patent Number: 5,231,059
[45] Date of Patent: Jul. 27, 1993

[54] PROCESS FOR PREPARING BLACK GLASS USING CYCLOSILOXANE PRECURSORS

[75] Inventors: Roger Y. Leung, Schaumburg; Stephen T. Gonczy, Mt. Prospect, both of Ill.

[73] Assignee: Allied-Signal Inc., Morris Township, Morris County, N.J.

[21] Appl. No.: 586,632

[22] Filed: Sep. 21, 1990

[51] Int. Cl.$^5$ .............................................. C03B 8/00
[52] U.S. Cl. ....................................... 501/12; 65/901; 65/18.1; 423/338
[58] Field of Search .................. 501/12; 423/338; 65/901, 18.1

[56] References Cited

U.S. PATENT DOCUMENTS

| Re. 32,107 | 4/1986 | January | 501/32 X |
|---|---|---|---|
| 3,944,519 | 3/1976 | Mink et al. | 260/46.5 JA |
| 4,234,713 | 11/1980 | LeGrow | 528/15 |
| 4,460,638 | 7/1984 | Haluska | 428/224 |
| 4,460,639 | 7/1984 | Chi et al. | 428/224 |
| 4,460,640 | 7/1984 | Chi et al. | 428/224 |
| 4,981,820 | 1/1991 | Renlund et al. | 501/55 X |
| 5,043,002 | 8/1991 | Dobbins et al. | 65/18.2 X |

OTHER PUBLICATIONS

Prewo et al., Ceramic Bulletin, vol. 65, No. 2 (1986).

*Primary Examiner*—William R. Dixon, Jr.
*Assistant Examiner*—Lisa M. Schull
*Attorney, Agent, or Firm*—Harold N. Wells; Gerhard H. Fuchs; Gerard P. Rooney

[57] ABSTRACT

A process for preparing an oxidation resistant black glass having the empirical formula $SiC_xO_y$, wherein $0 < x \leq 2.0$ and $0 < y \leq 2.2$. The process comprises reacting cyclosiloxane monomers to effect the bonding of one vinyl carbon atom to a silicon, curing the product at not greater than 250° C., and pyrolyzing at about 800°–1400° C. in an atmosphere containing a sufficient amount of oxygen to reduce the carbon content of the black glass to a desired level.

4 Claims, No Drawings

PROCESS FOR PREPARING BLACK GLASS USING CYCLOSILOXANE PRECURSORS

PRIOR ART

The invention relates generally to composite laminates in which a matrix material is reinforced with fibers. Such laminates are widely used for various purposes, but they are not generally applicable in situations where high temperatures are expected. However, the present invention relates to ceramic fiber-reinforced composites having application at temperatures which would destroy conventional polymeric materials and which have adjustable dielectric properties. Such composites can be used where microwave radiation is to be absorbed or transmitted.

Matrices having enhanced performance have been suggested for use with fibers having high strength at elevated temperatures. Examples of such matrix materials are the glass and glass ceramics (Prewo et al., Ceramic Bulletin, Vol. 65, No. 2, 1986).

In USSN 002,049 a ceramic composition designated "black glass" is disclosed which has an empirical formula SiCxOy where x ranges from 0.5 to about 2.0 and y ranges from about 0.5 to about 3.0, preferably x ranges from 0.9 to 1.6 and y ranges from 0.7-1.8. Such a ceramic material has a higher carbon content than prior art materials and is very resistant to high temperatures—up to about 1400° C. This black glass material is produced by reacting in the presence of a hydrosilylation catalyst to form a precursor polymer a cyclosiloxane having a vinyl group attached to a silicon atom with a cyclosiloxane having a hydrogen attached to a silicon atom. The precursor polymer is subsequently pyrolyzed to black glass. The present invention involves the application of such black glass to reinforcing fibers to form laminates very useful in applications associated with microwave radiation.

In U.S. Pat. No. 4,460,638 a fiber-reinforced glass composite is disclosed which employs high modulus fibers in a matrix of a pyrolyzed silazane polymer. Another possible matrix material is the resin sol of an organosilsesquioxane, as described in U.S. Pat. No. 4,460,639. However, such materials are hydrolyzed and since they release alcohols and contain excess water they must be carefully dried to avoid fissures in the curing process.

Another U.S. Pat. No. 4,460,640, disclosed related fiber reinforced glass composites using organopolysiloxane resins of U.S. Pat. No. 3,944,519 and U.S. Pat. No. 4,234,713 which employ crosslinking by the reaction of ≡SiH groups to CH$_2$=CHSi≡ groups. These latter two patents have in common the use of organosilsesquioxanes having C$_6$H$_5$SiO$_{3/2}$ units, which have been considered necessary by the patentees to achieve a flowable resin capable of forming a laminate. A disadvantage of such C$_6$H$_5$SiO$_{3/2}$ units is their tendency to produce free carbon when pyrolyzed. The present invention requires no such C$_6$H$_5$SiO$_{3/2}$ units, and still provides a flowable resin, and does not produce easily oxidized carbon.

Another disadvantage of the organopolysiloxanes used in the '640 patent is their sensitivity to water as indicated in the requirement that the solvent used be essentially water-free. The resins contain silanol groups and when these are hydrolyzed they form an infusible and insoluble gel. As will be seen, the present invention requires no such silanol groups and is thus insensitive to the presence of water. In addition, the organopolysiloxanes of the '640 patent may not have a long shelf life while those of the present invention remain stable for extended periods. Still another disadvantage for the organopolysiloxanes disclosed in the '640 is that they require a partial curing step before pressing and final curing. This operation is difficult to carry out and may prevent satisfactory lamination if the polymer is over cured. The present invention requires no pre-curing step.

In many applications a material useful at high temperatures is required for microwave applications. Such materials will have a relatively low dielectric constant and the loss tangent adjusted so that microwave radiation is absorbed or transmitted and not reflected and the material is not readily observed. High speed aircraft, missile radomes and the like may have a need for such materials. The high temperatures to which the materials are exposed make organic composites unsuitable. The inventors have found that certain fiber reinforced ceramics can provide low dielectric materials useful at high temperatures which would destroy conventional materials.

SUMMARY OF THE INVENTION

Broadly, the invention comprises articles capable of absorbing or transmitting microwave radiation comprising fiber-reinforced glass composites formed from refractory fibers in a carbon-containing black glass ceramic having the empirical formula SiC$_x$O$_y$ where x is greater than zero and up to about 2.0 and y is greater than zero and up to about 2.2. Preferably x is about 0.05 to 2 and y is about 0.5 to 2.2, most preferably x is about 0.3 to 1.6 and y is about 1.0 to 2.0.

The fiber reinforcement preferably is at least one refractory fiber selected from the group consisting of boron, silicon carbide, graphite, silica glass, quartz, S-glass E-glass, alumina, alumina silicate, alumina-silica-boria, boron nitride, silicon nitride, boron carbide, silicon carbonitride, titanium boride, titanium carbide, zirconium oxide, and zirconium-toughened alumina.

In a preferred embodiment, the black glass ceramic is the pyrolyzed reaction product of a polymer prepared from (1) a cyclosiloxane monomer having the formula

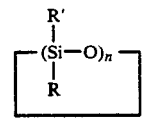

where n is an integer from 3 to about 30, R is hydrogen, and R' is an alkene of from 2 to about 20 carbon atoms in which one vinyl carbon atom is directly bonded to silicon or (2) two or more different cyclosiloxane monomers having the formula of (1) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms, said polymerization reaction taking place in the presence of an effective amount of hydroxilylation catalyst. The polymer product is pyrolyzed in a controlled atmosphere to a temperature in the range of about 800° C. to about 1400° C. to produce the black glass ceramic. The carbon content may be varied by introducing oxygen to the pyrolysis process which provides adjustment of the dielectric properties by reducing the carbon content to a desired value. The oxygen content of the pyrolysis atmosphere may be 0-100 vol.%, preferably 0 to 21 vol.%.

In one embodiment, the cyclosiloxane reaction product described above is combined with unidirectionally aligned refractory fibers or woven fabric. Plies of the coated fibers are layed-up to form a green laminate and thereafter pyrolyzed at a temperature between about 800° C. and about 1400° C., preferably about 850° C., to form the black glass composite. The laminate may be reimpregnated with polymer solution and repyrolyzed in order to increase density. Alternatively, a resin transfer technique may be used in which fibers are placed in a mold and the black glass matrix precursor is added to fill the mold before curing to form a green molded product. Thereafter, pyrolysis and reimpregnation steps may be carried out to increase density.

DETAILED DESCRIPTION OF THE PREFERRED EMBODIMENTS BLACK GLASS CERAMIC

The black glass ceramic used as the matrix has an empirical formula $SiC_xO_y$ wherein x is greater than zero and up to about 2.0, preferably about 0.05 to 2.0, most preferably about 0.3 to 1.6, and y is greater than zero and up to about 2.2, preferably about 0.5 to 2.2, most preferably about 1.0 to 2.0, whereby the carbon content is up to about 40% by weight. The black glass ceramic is the product of the pyrolysis in a controlled atmosphere at temperatures between about 800° C. and about 1400° C. of a polymer made from certain siloxane monomers. If a reduced carbon content is desired, oxygen may be introduced to the pyrolysis process.

The polymer precursor of the black glass ceramic may be prepared by subjecting a mixture containing cyclosiloxanes of from 3 to 30 silicon atoms to a temperature in the range of from about 10° C. to about 300° C. in the presence of 1-200 wt. ppm of a platinum hydrosilylation catalyst for a time in the range of from about 1 minute to about 600 minutes. When the polymer is placed in a controlled atmosphere, such as nitrogen, and pyrolyzed at a temperature in the range from about 800° C. to about 1400° C. for a time in the range of from about 1 hour to about 300 hours, black glass results. The amount of carbon in the black glass may be adjusted by varying the exposure to oxygen during pyrolysis or by varying the precursor compositions. It may be noted here that the term "pyrolysis" is being given a somewhat broader definition than is usual since it includes heating when some oxygen is present. The polymer formation takes advantage of the fact that a silicon-hydride will react with a silicon-vinyl group to form a silicon-carbon-carbon-silicon bonded chain, thereby forming a network polymer. For this reason, each cyclosiloxane monomer must contain either a silicon-hydride bond or a silicon-vinyl bond or both. A silicon-hydride bond refers to a silicon atom bonded directly to a hydrogen atom and a silicon-vinyl bond refers to a silicon atom bonded directly to an alkene carbon, i.e., it is connected to another carbon atom by a double bond.

The polymer precursor for the black glass ceramic may be defined generally as the reaction product of (1) a cyslosiloxane monomer having the formula

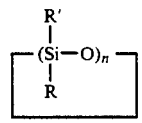

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from about 2 to 20 carbon atoms in which one vinyl carbon is directly bonded to silicon and R' is an alkyl group of from 1 to 20 carbon atoms, said reaction taking place in the presence of an effective amount of hydrosilylation catalyst.

The black glass ceramic may be prepared from a cyclosiloxane polymer precursor wherein both the requisite silicon-hydride bond and the silicon-vinyl bond are present in one molecule, for example, 1,3,5,7-tetravinyl-, 1,3,5,7-tetrahydrocyclotetrasiloxane. Alternatively, two or more cyclosiloxane monomers may be polymerized. Such monomers would contain either a silicon hydride bond or a silicon-vinyl bond and the molar ratio of the two types of bonds should be about 1:1, more broadly about 1:9 to 9:1.

Examples of such cyclosiloxanes include, but are not limited to:
1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane,
1,3,5,7,9,11,13,15,17,19,21,23,25,27,29-pentadecavinylpentadecahydrocyclopentadecasiloxane
1,3,5,7-tetrapropenyltetrahydrocyclotetrasiloxane,
1,3,5,7-tetrapentenyltetrapentylcyclotetrasiloxane and
1,3,5,7,9-pentadecenylpentapropylcyclopentasiloxane.

It will be understood by those skilled in the art that while the siloxane monomers may be pure species, it will be frequently desirable to use mixtures of such monomers, in which a single species is predominant. Mixtures in which the tetramers predominate have been found particularly useful.

While the reaction works best if platinum is the hydrosilylation catalyst, other catalysts such as cobalt, rhodium, nickel, and manganese carbonyl will perform adequately. The catalyst can be dispersed as a solid or can be used as a solution when added to the cyclosiloxane monomer. With platinum, about 1 to 200 wt. ppm, preferably 1 to 30 wt. ppm will be employed as the catalyst.

Black glass precursor polymer may be prepared from either bulk or solution polymerization. In bulk polymerization, neat monomer liquid, i.e., without the presence of solvents reacts to form oligomers or high molecular weight polymers. In bulk polymerization, a solid gel can be formed without entrapping solvent. Solution polymerization refers to polymerizing monomers in the presence of an unreactive solvent. Resin used in impregnating fibers to form unidirectional prepreg in our invention preferably is prepared by solution polymerization. The advantage of solution polymerization is the ease of controlling resin characteristics. In the present invention, soluble resin with the desirable viscosity, tackiness, and flowability suitable for prepregging and laminating can be obtained consistently using the solution polymerization process. The production of easily handleable and consistent resin is very critical in composite fabrication. It is very difficult to produce B-stage resin suitable for prepregs with consistent characteristics by bulk polymerization. For resin transfer molding and for reimpregnation of porous samples, bulk polymerization is preferred in forming the resin since there is no solvent to be evaporated during the curing process.

Fibers

Reinforcing fibers useful in the composites of the invention are refractory fibers which are of interest for applications where specific dielectric properties are needed. They include such materials as boron, silicon carbide, graphite, silica glass, quartz, S-glass, E-glass, alumina, aluminosilicate glasses, alumina-silica-boria, boron nitride, silicon nitride, boron carbide, silicon carbonitride, titanium boride, titanium carbide, zirconium oxide, and zirconium-toughened alumina.

The fibers may have various sizes and forms. They may be monofilaments from 1 $\mu$m to 200 $\mu$m diameter or tows of 200 to 5000 filaments. When used in composites of the invention they may be woven into fabrics, pressed into mats, or unidirectionally aligned with the fibers oriented as desired to obtain the needed physical properties.

The dielectric properties of the composites are determined by the corresponding properties of the fiber and the matrix. Dielectric constants for some ceramic materials in the GHz frequency range are listed as follows:

| Material | Dielectric Constant |
|---|---|
| Quartz, Astroquartz fiber | 3.78 |
| Nicalon ® fiber | 5.9 |
| Nextel 312 ® fiber | 5.2 |
| Nextel 440 ® fiber | 5.8 |
| Nextel 480 ® fiber | 5.8 |
| Alumina | 9.5–9.8 |
| Beryllia | 6.6–6.8 |
| Spinel | 8.2–8.4 |
| Silicon Nitride | 7.5–8.8 |
| Boron Nitride | 4.2–4.5 |

Dielectric constants of the composites can be adjusted by using different reinforcement fibers and varying the carbon content of the black glass matrix.

An important factor in the mechanical strength of the black glass composites is the interfacial bond between the fibers and the black glass matrix. Consequently, the fibers may be treated to provide the type of bonding desired, which may not necessarily be stronger than the matrix or the fiber itself. The surface deposits found on fibers as received or produced may be removed by solvent washing or heat treatment and the desired bonding agent applied by solution coating or vapor deposition.

Processing

As previously discussed, the black glass precursor is a polymer. It may be shaped into fibers or may be used in solution for coating or impregnating other fibers. Thus various methods will suggest themselves to those skilled in the art for combining the black glass precursor with reinforcing fibers. It would, for example, be feasible to combine fibers of the polymer with fibers of the reinforcing material and then to coat the resulting fabric or mat. Alternatively, the reinforcing fibers could be coated with a solution of the polymer and then formed into the desired shape. Coating could be done be dipping, spraying, brushing, or the like. In still another embodiment, the resin transfer technique can be employed in which the reinforcing fibers are placed in a mold and then the black glass precursor is added to fill the mold before curing to form the green molded product. In all methods the reinforcing fiber could be coated to insure a weak bond between matrix and reinforcement in the final composite where improved tensile strength is desired. Coating may be omitted where the end use does not require high tensile strength or fibrous fracture.

In a first method, a continuous fiber is coated with a solution of the black glass precursor polymer and then wound on a rotating drum covered with a release film which is easily separated from the coated fibers. After sufficient fiber has been built up on the drum, the process is stopped and the unidirectional fiber mat removed from the drum and dried. The resulting mat (i.e., "prepreg") then may be cut and laminated into the desired shapes.

In a second method, a woven or pressed fabric of the reinforcing fibers is coated with a solution of the black glass precursor polymer and then dried, after which it may be formed into the desired shapes by procedures which are familiar to those skilled in the art of fabricating structures with the prepreg sheets. For example, layers of prepreg sheets may be laid together and pressed into the needed shape. The orientation of the fibers may be chosen to strengthen the composite part in the principal load-bearing directions.

A third method for fabricating the polymer composite is by resin transfer molding. In this method a mold with the required shape is filled with the desired reinforcement material. The reinforcement could be a preform having a 3-dimensional weave of fibers, a lay-up of fabric plies, a non-woven mat of chopped staple or bundled tows, or assemblies of whiskers, and such others as are familiar to those skilled in the art.

The filled mold is injected, preferably under vacuum, with the neat monomer solution with an appropriate amount of catalyst. The relative amounts of vinyl- and hydro-monomers will be adjusted to obtain the desired carbon level in the pyrolyzed matrix. The low viscosity (<50 centipoise) of the neat monomer solution is exceptionally well suited for resin impregnation of thick wall and complex shape components.

The filled mold is then heated to about 30° C.–280° C. for about ½–30 hours as required to cure the monomer solutions to a fully polymerized state. The specific cure cycle is tailored for the geometry and desires state of cure. For example, thicker wall sections require slower cures to prevent uneven curing and exothermic heat build-up. The cure cycle is tailored through control of the amount of catalyst added and the time-temperature cycle. External pressure may be used during the heating cycle as desired.

When the component is fully cured, it is removed from the mold. In this condition it is equivalent in state to the composite made by lamination and autoclaving of prepreg plies. Further processing consists of the equivalent pyrolysis and impregnation cycles to be described for the laminated components.

Solvents for the black glass precursor polymers include hydrocarbons, such as toluene, benzene, xylene, hexane, and octane, and oxygen-containing solvents, such as methylethylketone, butanol, chloroform, tetrahydrofuran, and the like. Mixtures of solvents may be used. Concentration of the prepregging solution may vary from about 10% to about 70% of resin by weight. Precursor polymer used in impregnating the fibers is usually prepared from solution polymerization of the respective monomers.

Since the precursor polymers do not contain any hydrolyzable functional groups, such as silanol, chlorosilane, or alkoxysilane, the precursor polymer is not water sensitive. No particular precaution is needed to exclude water from the solvent or to control relative humidity during processing.

Our resin ages very slowly when stored at or below room temperatures as is evident from their shelf life of more than three months as these temperatures. The resin is stable both in the solution or in the prepreg. Prepregs stored in a refrigerator for three months have been used to make laminates without any difficulty. Also, resin solution stored for months have been used for making prepregs successfully.

Large and complex shape components can be fabricated from laminating prepregs. One method is hand lay-up which involves placing the resin-impregnated prepregs manually in an open mold. Several plies of prepregs cut to the desired shape are layed-up to achieve the required thickness of the component. Fiber orientation can be tailored to give maximum strength in the preferred direction. Fibers can be oriented unidirectionally [0], at 90° angles [0/90], at 45° angles [0/45 or 45/90], and in other combinations as desired. The layed-up plies are then bonded by vacuum compaction before autoclave curing. Another fabrication method is tape laying which used pre-impregnated ribbons in forming composites. Our resins can be controlled to provide the desired tackiness and viscosity in the prepreg for the lay-up procedures.

After the initial forming, the composites may be consolidate and cured by heating to temperatures up to about 250° C. under pressure. In one method, the composite prepreg is placed in a bag, which is then evacuated and the outside of the bag placed under a pressure sufficient to bond the layered prepreg, say up to about 1482 kPa. The resin can flow into and fill up any voids between the fibers, forming a void-free green laminate. The resulting polymer-fiber composite is dense and is ready for conversion of the polymer to black glass ceramic. If an excessively cured prepreg is used, as is possible with the method of U.S. Pat. No. 4,460,640, there will be no adhesion between the plies and no flow of resin material and no bonding will occur.

Heating the composite to temperatures from about 800° C. up to about 1400° C. in an inert or controlled atmosphere (pyrolysis) converts the polymer into a black glass ceramic containing essentially only carbon, silicon, and oxygen. It is characteristic of the black glass prepared by pyrolyzing the cyclosiloxanes described above that the resulting black glass has a large carbon content, but is able to withstand exposure to temperatures up to about 1400° C. in air without oxidizing to a significant degree. Pyrolysis is usually carried out with a heating to the maximum temperature selected, holding at that temperature for a period of time determined by the size of the structure, and then cooling to room temperature. Little bulk shrinkage is observed for the black glass composites and the resulting structure typically has about 70–80% of its theoretical density. When oxygen is included in the pyrolysis step some carbon is lost by oxidation, thus permitting an adjustment of the carbon content of the black glass produced, which in turn changes the dielectric constant of the black glass.

Conversion of the polymer to black glass takes place between 430° C. and 950° C. Three major pyrolysis steps were identified by thermogravimetric analysis at 430° C.–700° C., 680° C.–800° C. and 780° C.–950° C. The yield of the polymer-glass conversion up to 800° C. is about 83%; the third pyrolysis mechanism occurring between 780° C. and 950° C. contributed a final 2.5% weight loss to the final product.

Since the pyrolyzed composite structure still retains voids, the structure may be increased in density by impregnating with a neat monomer liquid or solution of the black glass precursor polymer. The solution is then gelled by heating to about 50° C.–120° C. for a sufficient period of time. Following gelation, the polymer is pyrolyzed as described above. Repeating these steps, it is feasible to increase the density to about 95% of the theoretical.

The above procedures will be illustrated in more detail in the examples below. Examples 1-6 describe the procedures used to prepare fiber reinforced black glass laminates, while Examples 7-11 illustrate the properties of such laminates, particularly the dielectric properties which permit the laminates to be applied where microwave radiation is to be absorbed or transmitted, giving low observable properties. Example 12 illustrates the effect of changing the oxygen content of the pyrolysis atmosphere. Example 13 shows the effect of temperature on the dielectric properties.

EXAMPLE 1

Polymer Precursor Preparation

The cyclosiloxane having silicon-vinyl bond was poly(vinylmethylcyclosiloxane) (ViSi). The cyclosiloxane with a silicon-hydride bond was poly(methylhydrocyclosiloxane) (HSi). Both cyclosiloxanes were mixtures of oligomers, about 85% by weight being the cyclotetramer with the remainder being principally the cyclopentamer and cyclohexamer. A volume ration of 59 ViSi/41 HSi was mixed with 22 wt. ppm of platinum as a platinum-cyclovinylmethylsiloxane complex in isooctane to give a 10 vol. percent solution of the cyclosiloxane monomers. The solution was heated to reflux conditions (about 99° C.) and refluxed for about 75 minutes. Then, the solution was concentrated under reduced pressure at 50° C. to a 30 wt.% concentration suitable for use in prepregging. The resin produced was poly(methylmethylenecyclosiloxane) (PMMCS). It was tacky at room temperature, and was flowable at temperatures of about 70° C. or higher and thus suitable for use as a B-stage resin.

EXAMPLE 2

Prepregging

An apparatus was set up for coating fibers with the PMMCS polymer and winding them on a rotating drum covered with a sheet of prepreg release film. The apparatus employed three pulleys to carry the fibers and to lay the fibers uniformly and to produce no gaps nor undesired overlapped fibers. The middle pulley was immersed in the polymer resin solution so the fiber pulled through it would be coated with the resin. After the amount of fiber needed was spun onto the drum, the drum was left to rotate so that the resin would dry uniformly thorughout the prepreg. After the prepreg was dry enough to handle, it was removed from the drum and dried for 12 hours at 23° C. The length of the prepreg was 1448 mm, the same as the circumference of the drum. The width depended on how much fiber was spun onto the drum (max. of 406 mm). Prepregs were made from various continuous fibers including Nicalon®$^{(a)}$, PRD-166®$^{(b)}$, Nextel-480®$^{(c)}$, Astroquartz$^{(d)}$, and Thornel®$^{(e)}$. Resin content in the prepregs were usually between about 20 to 45 wt.% with a fiber areal weight of about 250 to 600 gm/m$^2$.

(a) Nicalon® is a silicon carbide fiber from Dow Corning.

(b) PRD-166® is a zirconia-toughened alumina fiber from DuPont.

(c) Nextel-480® is an alumina-silica-boria fiber by 3M.

(d) Astroquartz is a silica quartz fiber from J. P. Stevens.

(e) Thornel T300 is a pan-based carbon fiber from Amoco.

EXAMPLE 3

Lay-Up

After the prepreg of Example 2 was dried, it was cut into plies with the shapes and fiber orientation required for the component to be made. The thickness of the component was built by laying up a number of plies together. Vacuum compaction was used to press the plies together. The first ply was placed in the mold and then additional plies were added to the preceding plies by applying a vacuum.

EXAMPLE 4

Autoclave Curing

Laminates prepared in Example 3 were consolidated by autoclave curing in a vacuum bag. The uncured piece was bagged and vacuum was pulled on the bag while the whole bag was subjected in 689.5 kPa (gauge) gas pressure. The full curing cycle under 689.5 kPa (gauge) of gas pressure was as follows:

(a) heat at 3° C./min to 65° C., (b) hold at 65° C. for 30 minutes, (c) heat to 150° C.-200° C. at 3° C./min, (d) dwell at 150° C.-200° C. for ½ to 2 hours, and (e) slow cool to 50° C.

After autoclave curing, a fiber reinforced green laminate was obtained. Bleeding of resin during autoclave curing was less than 1.0%. The consolidated green laminate can be further hardened by post curing at 200° C. for 2-4 hours, but may be omitted if the green laminate is sufficiently rigid for further processing.

EXAMPLE 5

Pyrolysis

The cured laminates of Example 4 were pyrolyzed in a controlled atmosphere furnace to convert them to black glass composites. The pyrolyzation cycle was as follows:

(a) increase temperature from 20° C. to the maximum of 850° C.-1200° C. over 8-12 hours, (b) hold at the maximum temperature for 1 to 2 hours, and (c) cool from 850° C.-1200° C. to 20° C. over 8-12 hours.

The pyrolysis was carried out in flowing nitrogen at a flowrate of about 1 liter per minute. The as-pyrolyzed samples were about 70-80% of their theoretical densities. The char yield of the resin was 84% by weight. For the composites, the char yield was 90-95%, depending upon the fiber loading.

EXAMPLE 6

Reimpregnation

Neat oligomer solution consisting of poly(vinylmethylcyclosiloxane) and poly(methylhydrocyclosiloxane) in a volume ration of 59 to 41 without solvent but containing the platinum catalyst as in Example 1 was used for infiltration under vacuum of the as-pyrolyzed porous black glass laminates of Example 5. The impregnated samples may be pressurized to 414-689 kPa (gauge) pressure to force the liquid into the pores of the composites. The impregnated samples were then gelled at 55° C.-85° C. for 3-5 hours. After gelation, the samples were pyrolyzed in flowing nitrogen as in Example 5 to 850° C.-1200° C. to form more black glass to fill the voids in the laminates. Repeating reimpregnations 4 or 5 times increased the density of 90-94% of the theoretical.

EXAMPLE 7

Astroquartz fabric supplied by J. P. Stevens industrial Fabrics, Greenville, S.C. was used to prepare low observable composites. Astroquartz is a silica fiber and was used in an 8H satin weave. A 30 wt.% solution of poly(methylmethylene cyclosiloxane) was brushed onto the fabric to provide 51 wt.% resin in the coated fabric after evaporation of solvent. Four 203 mm by 203 mm plies of the coated fabric were layed-up and then cured in an autoclave at 150° C. and 689.5 kPa gauge. After curing, the green laminate was cut into test samples of 63.6×63.6 mm and 63.6 mm×6.36 mm. The samples were pyrolyzed in nitrogen or air by the procedure of Example 5 and then reimpregnated as described in Example 6. Five cycles of pyrolysis and reimpregnation were carried out on three samples with the atmosphere used and the resulting density given in the following table.

TABLE A

| No. Impreg. | Sample 1 | | Sample 2 | | Sample 3 | |
|---|---|---|---|---|---|---|
| | Atmos. | Density | Atmos. | Density | Atmos. | Density |
| 0 | Air | 1.44 | N$_2$ | 1.37 | N$_2$ | 1.37 |
| 1 | " | 1.67 | Air | 1.52 | " | 1.57 |
| 2 | " | 1.80 | " | 1.65 | " | 1.75 |
| 3 | " | 1.90 | " | 1.75 | " | 1.78 |
| 4 | " | 1.97 | " | 1.81 | " | 1.84 |
| 5 | " | 2.01 | " | 1.95 | " | 1.88 |

After completing the preparation of the samples they were characterized as shown in the following table.

TABLE B

| | Sample No. | | |
|---|---|---|---|
| | 1 | 2 | 3 |
| Fiber | Astroquartz (37.9 wt. %) | Astroquartz (37.8 wt. %) | Astroquartz (39.2% wt. %) |
| Matrix | Silica (62.1 wt. %) | $SiO_2$ + Black Glass (62.2 wt. %) | Black Glass (60.8 wt. %) |
| Fiber:Matrix; Void (Vol. %) | 34.9:57.2:7.9 | 33.9:55.8:10.3 | 34.2:53.1:12.7 |
| Bulk Composition (wt. %) | Carbon: 1.1% Silicon: 44.9% Oxygen: 54.0% | 5.4% 45.2% 49.4% | 12.1% 44.2% 43.7% |
| Density (gm/mL) | 2.01 | 1.95 | 1.88 |
| Thickness | 0.422 cm | 0.439 cm | 0.432 cm |
| Voids (Porosity) | 8% | 9% | 8% |

The theoretical density of the composites is 2.2 gm/mL. The carbon content in the composites was determined using the LECO carbon analyzer while the weight percentage of silicon was obtained from atomic absorption spectroscopy of the lithium fusion sample. The amount of oxygen was calculated from difference, assuming no significant amount of hydrogen and nitrogen present.

It can be seen that the atmosphere has as an important effect on the amount of carbon in the finished sample. Air removed nearly all of the carbon while nitrogen leaves the most carbon and Sample 2 having been exposed to nitrogen at first and then air has lost a major portion of the potential carbon content.

EXAMPLE 8

The samples of Example 7 were measured at room temperature and the dielectric constants in air were found to be 3.20–3.31 for Sample 1, 3.22–3.38 for Sample 2 and 3.25–3.45 for Sample 3 at microwave frequencies between 40 and 50 GHz. The measurements were repeated at higher temperatures, with the following results.

TABLE C

| | Sample 1 | | Sample 2 | | Sample 3 | |
|---|---|---|---|---|---|---|
| Temp. | $k_t/k_r$* | tan δ** | $k_t/k_r$ | tan δ | $k_t/k_r$ | tan δ |
| R.T. | 1.000 | <0.002 | 1.00 | <0.002 | 1.000 | <0.002 |
| 250° C. | 1.015 | <0.002 | — | — | 1.010 | <0.002 |
| 300° C. | — | — | 1.014 | <0.002 | — | — |
| 550° C. | 1.032 | 0.004 | — | — | — | — |
| 650° C.-660° C. | 1.040 | 0.005 | 1.030 | 0.005 | 1.024 | 0.006 |
| 735° C.-750° C. | — | — | 1.038 | 0.005 | 1.028 | 0.009 |
| 870° C.-880° C. | 1.057 | 0.008 | 1.043 | 0.010 | 1.033 | 0.011 |

*ratio of dielectric constant at designated temperature $(k_t)$/room temerature $(k_r)$
**loss tangent It will be seen that the increase in dielectric constant with temperature is small for all three samples. Also, the dielectric constant of a composite may be varied by adjusting the carbon content. All samples showed an irreversible change in dielectric constant when heated above about 925° C. due to the onset of phase transformation of the Astroquartz fiber.

EXAMPLE 9

Three-point flexure tests were done using 5.6×4.0 mm test bars of Samples 1 and 3. Both had relatively low strength—4.6 ksi for Sample 1 and 2.68 ksi for Sample 3. Both exhibited brittle fracture.

EXAMPLE 10

Two black glass composites (Samples 4 and 5) reinforced with Nextel 480 ® fiber were prepared in a similar manner to that of the previous Example 3 except that the prepregs were unidirectional tapes and reimpregnation was carried out under different atmospheres. After pyrolysis and reimpregnation in nitrogen or air (Sample 4—four impregnations in air followed by one in nitrogen atmosphere: Sample 5—two reimpregnations in air followed by two in a nitrogen atmosphere) the unidirectional composites were characterized as shown in the following table.

TABLE D

| | Sample | |
|---|---|---|
| | 4 | 5 |
| Fiber | Nextel 480 ® | Nextex 480 ® |
| Bulk Compositions: | Nextel ®: 5.46 wt. % Black Glass: 2.5 wt. % Silica: 42.9 wt. % | Nextel ®: 55.6 wt. % Black Glass: 9.2 wt. % Silica: 35.2 wt. % |
| Fiber:Black Glass:Silica: Void (Vol. %) | 42.6:2.7:46.4:8.3 | 42.4:9.7:37.2:10.7 |
| # of Plies | 16, [0] | 12, [0] |
| Weight | 29.58 gm | 21.84 gm |
| Dimensions: | 63.5 mm × 50.8 mm × 3.96 mm | 63.5 mm × 50.8 mm × 2.992 mm |
| Density: | 2.30 gm/mL | 2.23 gm/mL |
| Voids (Porosity): | 9% | 12% |

The samples were heated in air to 1250° C. for several hours and then the dielectric constants were measured, at room temperature and above, in a similar manner to Example 8. The room temperature dielectric constants in air were 4.68 for Sample 4 and 4.52 for Sample 5. The data for higher temperatures are shown in the following table.

TABLE E

| | Sample 4 | | Sample 5 | |
|---|---|---|---|---|
| Temp. (°C.) | $k_t/k_r$ | tan δ | $k_t/k_r$ | tan δ |
| R. T. | 1.00 | 0.006 | 1.000 | 0.010 |
| 300 | 1.020 | 0.007 | 1.023 | 0.011 |
| 448–500 | 1.028 | 0.008 | 1.038 | 0.013 |
| 616–640 | 1.048 | 0.014 | 1.051 | 0.018 |
| 741–760 | 1.059 | 0.020 | 1.062 | 0.024 |
| 893–926 | 1.073 | 0.030 | 1.080 | 0.030 |
| 1000 | 1.079 | 0.033 | 1.092 | 0.035 |

These results indicate that with Nextel ® reinforcement the dielectric constant is significantly higher and increases more with temperature than the Astroquartz fibers of Example 8. Also, the loss tangent and therefore the amount of microwave absorption increases significantly with a rise in temperature.

EXAMPLE 11

A composite was made using ceramic grade Nicalon ® fiber as reinforcement. It contained 10 piles in a [0/90] orientation and contained 66.6 wt.% Nicalon ® with 33.4 wt.% black glass. The density was 2.18 gm/mL or 89.8% of theoretical. The sample was measured for dielectric properties as before after a heat treatment at 1250° C. The room temperature dielectric constant was 6.3 with a loss tangent of 0.07. The values at higher temperatures are given in the following table.

TABLE F

| Temp. (°C.) | $K_t/k_r$ | tan δ |
| --- | --- | --- |
| Room | 1.000 | 0.07 |
| 250 | 1.022 | 0.07 |
| 560 | 1.060 | 0.07 |
| 780 | 1.075 | 0.11 |
| 1000 | 1.105 | 0.13 |

The ceramic grade Nicalon ®-black glass composite is more radar absorbing than Astroquartz composites.

EXAMPLE 12

11.8 mL of poly(vinylmethylcyclosiloxane) was mixed with 8.2 mL of poly(methylhydrocyclosiloxane) without employing solvent. After adding 22 ppm platinum by weight as in Example 1, the mixture gelled to form a clear crack-free solid on heating at 55° C. for 3 hours. The gel was then pyrolyzed in a controlled atmosphere with different concentrations of oxygen to form ceramics. The amount of oxygen varied from 0% (pure nitrogen) to 21% oxygen (air). The pyrolysis cycles consisted of heating to 850° C. over 8 hours, holding for 1 hours, and then cooling to room temperature over 8 hours. The carbon and silicon contents of the pyrolyzed products were analyzed in the LECO carbon analyzer and atomic absorption techniques respectively. The compositions are listed as follows:

| Oxygen % | Carbon Wt. % | Flow Rate | Char Yield | Composition |
| --- | --- | --- | --- | --- |
| 0 | 27% | 0.8 L/min | 84% | $SiC_{1.37}O_{1.03}$ |
| 2% | 22% | 1.0 L/min | 85% | $SiC_{1.15}O_{1.09}$ |
| 5% | 17% | 0.4 L/min | 87% | $SiC_{0.91}O_{1.55}$ |
| 10% | 13% | 0.2 L/min | 86% | $SiC_{0.71}O_{1.69}$ |
| 21% | 0.7% | 0 | 80% | $SiC_{0.036}O_{2.10}$ |

As expected, the amount of carbon in the silicon carboxide black glass decreased with increasing oxygen concentrations in the pyrolysis atmosphere. The weight percent of silicon in all these samples was 44-45%. Pyrolysis of the precursor in stagnant air produced essentially silica with only trace amount of carbon.

Black glasses $SiC_{1.15}O_{1.09}$ and $SiC_{0.91}O_{1.55}$, which were the products of the 2% and 5% oxygen pyrolysis, were heated subsequently in stagnant air at 850° C. for 5 hours. The carbon contents after the heat treatment in air were 22% and 16% respectively with weight loss less than 1.0% showing that the carbon in the black glass is oxidation resistant even though present at a reduced level.

EXAMPLE 13

Samples 1, 2, and 3 in Example 7 were tested for dielectric properties from room temperature to 1093° C. at a constant frequency of 10 GHz. These samples were first heated in air to 1093° C. to stabilize the matrix. The results are listed in the following table.

| Sample No. | Temp. (°C.) | Dielectric Constant | Loss Tangent |
| --- | --- | --- | --- |
| 1 | 18 | 3.60 | 0.031 |
| | 260 | 3.63 | 0.032 |
| | 538 | 3.68 | 0.033 |
| | 816 | 3.72 | 0.035 |
| | 1093 | 3.77 | 0.042 |
| 2 | 54 | 3.58 | 0.027 |
| | 260 | 3.60 | 0.031 |
| | 538 | 3.70 | 0.032 |
| | 816 | 3.75 | 0.042 |
| | 1093 | 3.80 | 0.102 |
| 3 | 18 | 3.79 | 0.031 |
| | 260 | 3.80 | 0.035 |
| | 538 | 3.90 | 0.054 |
| | 816 | 4.02 | 0.123 |
| | 1093 | 4.23 | 0.257 |

These three samples with different carbon contents displayed low dielectric constants up to the test temperature of 1093° C. in air. The dielectric constants of the three samples were in the narrow range of 3.6-3.8 up to 760° C. with corresponding loss tangent less than 0.05. After 760° C., the dielectric properties of the samples rose more gradually than before. For the high carbon sample (3), the increase in the temperature coefficient of loss tangent started at 450° C. These materials have the potential for high temperature radome applications.

We claim:

1. A process for preparing an oxidation resistant black glass having the empirical formula SiCxOy wherein x is greater than zero and up to about 2.0 and y is greater than zero and up to about 2.2 which comprises:

(a) reacting (1) a cyclosiloxane monomer having the formula

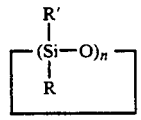

where n is an integer from 3 to 30, R is hydrogen, and R' is an alkene of from 2 to 20 carbon atoms in which one vinyl carbon atom is directly bonded to silicon or (2) or more different cyclosiloxane monomers having the formula of (1) where for at least one monomer R is hydrogen and R' is an alkyl group having from 1 to 20 carbon atoms and for the other monomers R is an alkene from 2 to 20 carbon atoms in which one vinyl carbon is directly bonded to silicon and R' is an alkyl group of from 1 to 20 carbon atoms, said reaction taking place in the presence of an effective amount of hydrosilylation catalyst;

(b) curing the reaction product of (a) at a temperature not greater than 250° C.;

(c) pyrolyzing the cured product of (b) to form said black glass at a temperature of about 800° C. to about 1400° C. in an atmosphere containing a sufficient amount of oxygen to reduce the carbon content of said black glass to a desired value.

2. The method of claim 1 wherein the pyrolysis of (c) is carried out at a temperature of about 850° C.

3. The method of claim 1 wherein the pyrolysis of (c) is carried out in an atmosphere containing greater than zero and up to 100 vol.% oxygen.

4. The method of claim 3 wherein the pyrolysis of (c) is carried out in an atmosphere containing greater than zero and up to 21 vol.% oxygen.

* * * * *